May 31, 1966 A. W. ANDERSON ET AL 3,254,139
POLYPROPYLENE MODIFIED LINEAR ETHYLENE COPOLYMERS
Filed March 1, 1961
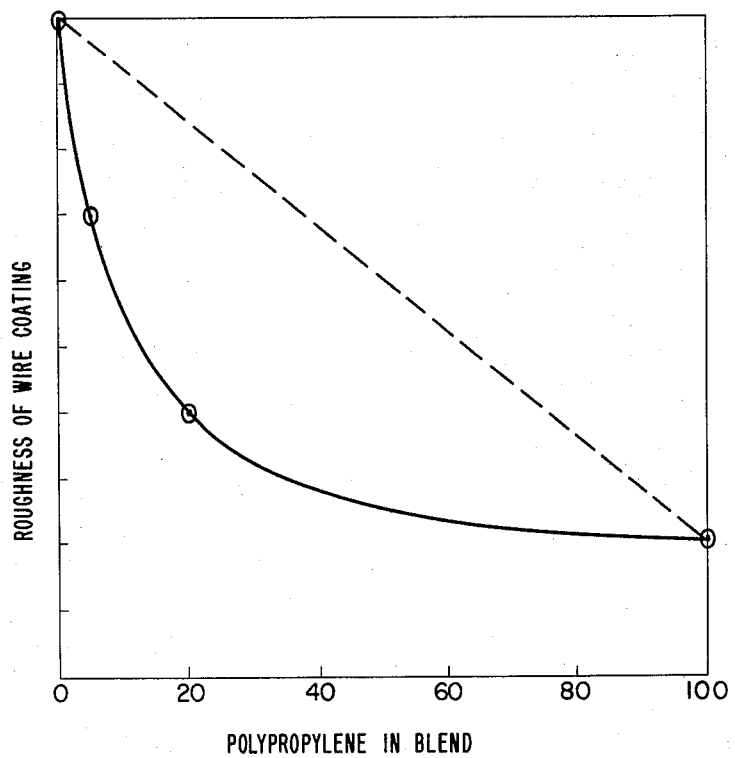
ROUGHNESS OF WIRE COATING VS POLYPROPYLENE CONTENT FOR POLYPROPYLENE-ETHYLENE COPOLYMER BLENDS
INVENTORS
ARTHUR W. ANDERSON
DONALD H. PAYNE
BY
ATTORNEY

United States Patent Office 3,254,139
Patented May 31, 1966

3,254,139
POLYPROPYLENE MODIFIED LINEAR ETHYLENE COPOLYMERS
Arthur William Anderson and Donald Hughel Payne, Wilmington, Del., assignors to E. I. du Pont de Nemours and Company, Wilmington, Del., a corporation of Delaware
Filed Mar. 1, 1961, Ser. No. 92,632
4 Claims. (Cl. 260—897)

This invention relates to blends of linear, normally solid polypropylene with linear, normally solid polymers of ethylene and is a continuation-in-part of an earlier application Serial No. 470,156, filed November 27, 1954, now abandoned.

It heretofore has been discovered that blends of polyethylene and polypropylene, both prepared by means of coordination catalysis, possess some properties which cannot be predicted by assuming a linear compositional relationship between the properties of the component homopolymers. By means of such polymer blends it has been found possible to partially bridge the gap in properties between the conventional, low density (about 0.92–0.93 g./cc.), branched polyethylenes and the higher density (about 0.94–0.97 g./cc.), essentially unbranched polyethylenes. The magnitude of this gap may be seen from some of the properties of two such homopolymers of ethylene, each having about the same melt index, as shown in the following table:

|   |   | Low density branched polyethylene | High density essentially unbranched polyethylene |
|---|---|---|---|
| 1 | Melt index, A.S.T.M. D-1238-57T | 0.31 | 0.27 |
| 2 | Density, A.S.T.M. D-792-50 | 0.921 | .962 |
| 3 | Tensile strength, 2″/min. A.S.T.M. D-412-51T, p.s.i. | 2,200 | 4,070 |
| 4 | Yield point, 2″/min. A.S.T.M. D-412-51T, p.s.i. | 1,700 | 3,750 |
| 5 | Elongation, 2″/min. A.S.T.M. D-412-51T, percent | 590 | 660 |
| 6 | Stiffness, A.S.T.M. D-747-58T, p.s.i. | 26,000 | 107,000 |

The higher density polyethylenes as well as the polypropylenes used in the formation of the aforementioned blends may be prepared using coordination catalysts which consist essentially of compounds, and preferably halides, of transition elements in Groups IIIb, IVb, Vb and VIb of the Periodic Chart of the Elements such as is shown on pages 448–9 of the Handbook of Chemistry and Physics, 41st edition, 1959, and organometallic, metallic or metallic hydride reducing agents. The blends of coordination polymerization polyethylene and polypropylene, in addition to partially bridging the gap in properties between the branched and essentially unbranched polyethylenes, provide unusual and unexpected properties which cannot be predicted on the basis of a compositional relationship. For example, the processibility, i.e. ease of fabrication, of these blends in many cases exceeds what normally would be expected considering the individual components.

It is the object of the present invention to provide hydrocarbon polymer blends which possess an even broader range of properties than those exhibited by the aforementioned blends, thereby opening up new uses for hydrocarbon polymers. A further object is to provide blends which exhibit unusual ease of processibility. Other objects will become apparent hereinafter.

The objects of the present invention are achieved by varying the composition of the coordination polymerization ethylene polymer in the blend. This may be accomplished by introducing a comonomer during the coordination polymerization of the ethylene to give a copolymer which contains both monomer units chemically bonded together within the polymer. The comonomer may be a terminally unsaturated hydrocarbon containing more than three carbon atoms. The preferred comonomers are terminally unsaturated aliphatic hydrocarbons which contain from four to eighteen carbon atoms. Those which have been found to be of especial usefulness include 1-butene, 1-octene and 1-decene. Although the comonomer concentration may be varied over a wide range to give ethylene copolymers containing large or small amounts of the comonomer chemically bonded therein, the most satisfactory ethylene copolymers have been found to consist of 0.1–50 weight percent, and usually 5–30 weight percent chemically bonded comonomer. A particularly useful range has been found to be 10–25 weight percent. The density of these copolymers generally will lie in the range of 0.900–0.960 g./cc.

The normally solid polypropylenes used in the invention are prepared by means of coordination catalysis in essentially the same way as the ethylene copolymers. The densities of the useful polypropylenes so prepared lie in the range 0.870–0.920 g./cc.

An indication of the unusual nature of the blends of the above ethylene copolymers and polypropylene may be seen in their applications as wire coating resins. Per se, the aforementioned ethylene copolymers cannot be used as insulation on wire, since the polymers which have the necessary physical properties cannot be applied to the wire smoothly and uniformly at the conventional wire coating speeds, while those resins which can be applied to the wire satisfactorily do not possess the required physical properties. Furthermore, polypropylene itself, although it can be applied to the wire uniformly and smoothly, likewise does not exhibit the desired properties necessary for many wire coating applications. However, when only small quantities of polypropylene are blended with the above ethylene copolymers, the resultant mixtures not only possess characteristics desirable in wire coatings, but they can be applied smoothly and uniformly without sacrifice of speed of application. The effectiveness of the polypropylene in reducing the roughness of the coating when blended into the ethylene copolymer may be seen in the attached figure. Particularly useful are those blends which contain up to 40 weight percent polypropylene, and especially between 2 and 30 weight percent. The ethylene copolymer in such blends preferably consists of 70–95 weight percent ethylene units and 5–30 weight percent comonomer units containing from more than three to eighteen carbon atoms, and in particular those containing four, eight or ten carbon atoms and derived from 1-butene, 1-octene or 1-decene.

Although for most applications the polypropylene-ethylene copolymer blends are comprised of up to 40 weight percent polypropylene, there are some applications which require larger amounts of this component. For example, it was discovered that these hydrocarbon blends provide exceptional usefulness when they are applied to wire as foamed coatings. The advantages of a foamed coating on wire are at least twofold, and include superior electrical properties and cheaper cost, both due to the replacement of polymer with a nonconductive gas. For foamed wire coatings it is preferable to include 25 to 75 weight percent polypropylene in the blend and especially between 25 and 50 weight percent. The composition of the ethylene copolymer preferably is maintained within the aforementioned limits.

Blends of normally solid ethylene copolymers and normally solid polypropylene can be made by dissolving the individual components in a common organic solvent such as boiling xylene, and separating the blend from the solution in any convenient manner such as by the addition of a liquid which is a non-solvent for the polymer, but which is miscible with the polymer solvent. The blends also can be made by milling the polymers together. For many applications, however, the components may be pre-blended just prior to fabrication or they may be fed simultaneously into the processing equipment, thus permitting mixing in the melt phase. This method is especially advantageous in an extrusion operation where a screw, melt conveyor provides adequate mixing of the components.

The molecular weights of the useful components of the blends are expressed in terms of a rheological measurement, namely melt index, as measured by standard A.S.T.M. test No. D-1238-57T. The useful range of melt indexes of the blends for many applications is about 0.005 to 5.0. At a melt index below this range the blends are too intractable to be shaped by conventional methods, while at a melt index above 5.0, the blends are too brittle. Between these two extremes the optimum range of melt indexes is about 0.1 to 3.0. One way by which it is possible to obtain a blend having a melt index within any desired range is to use components, each of which has a melt index within said range.

The following examples are given to illustrate but are not intended to limit the usefulness of the blends described in this invention. All polymers are prepared by means of coordination catalysis as indicated in the specification above.

EXAMPLE I

An ethylene-1-butene copolymer containing 3 weight percent bound butene, melt index 4.3, density 0.937, gives a very rough coating when applied as a 0.015 inch jacket to #22 copper wire at a rate of 600 ft./min. using a conventional 2 inch N.R.M. (National Rubber Machinery) wire coating extruder. When this copolymer is blended with 25 weight percent polypropylene, the coating applied as above is smooth and remains so even when the wire coating speed is increased to 1000 ft./min.

EXAMPLE II

An ethylene-1-octene copolymer containing 3½ weight percent bound octene, melt index 1.3, density 0.935, is applied as a 0.012 inch coating to #19 copper wire using a 3¼ inch Davis standard wire coating extruder. The maximum speed at which the coating remains smooth is 57 ft./min. at a stock temperature of 288° C. When polypropylene is blended into this copolymer prior to extrusion, a very marked improvement in smoothness is observed when the polypropylene concentration reaches about 5 weight percent of the blend. When the same copolymer is pre-blended so as to contain 20 weight percent polypropylene, blend melt index 1.3, density 0.930, the coating is applied smoothly at 1530 ft./min. even with the stock temperature reduced to 268° C.

EXAMPLE III

Example II is repeated using an ethylene-1-decene copolymer, bound comonomer content about 3 weight percent. Under essentially the same conditions as above the wire coating is rough even at low rates of application. As polypropylene is blended with the copolymer, the roughness decreases until at about 15 weight percent polypropylene, the coating remains smooth even after the rate of application is increased to conventional, commercial, coating rates.

EXAMPLE IV

A 50:50 blend of polypropylene and an ethylene-1-decene copolymer is extruded over #19 copper wire from a 3¼ inch Davis standard wire coating machine in the presence of 0.75 weight percent "Celogen" AZ, an azodicarbonamide blowing agent. The foamed coating of the blend, containing 50% gas, is applied much more readily than is the foamed unblended copolymer. The improvement in processibility observed with the blends is not limited, therefore, to solid wire coating applications.

We claim:
1. A composition comprising a normally solid polypropylene and a copolymer consisting of ethylene and a terminally unsaturated aliphatic hydrocarbon containing from 4 to 18 carbon atoms, said copolymer containing from about 0.1% to about 50% by weight of combined said unsaturated aliphatic hydrocarbon and wherein said composition contains from about 2% by weight to about 75% by weight polypropylene based on the combined weight of said polypropylene and said copolymer.
2. Composition of claim 1 wherein the ethylene copolymer is prepared from ethylene and 1-butene.
3. Composition of claim 1 wherein the ethylene copolymer is prepared from ethylene and 1-octene.
4. Composition of claim 1 wherein the ethylene copolymer is prepared from ethylene and 1-decene.

References Cited by the Examiner

UNITED STATES PATENTS

| | | | |
|---|---|---|---|
| 2,628,214 | 2/1953 | Pinkney et al. | 260—897 |
| 2,919,266 | 12/1959 | Lauer | 260—88.2 |
| 2,928,756 | 3/1960 | Campbell | 260—897 |
| 2,951,066 | 8/1960 | Coover et al. | 260—93.7 |
| 2,953,552 | 9/1960 | Stampa et al. | 260—88.2 |
| 3,036,987 | 5/1962 | Ranalli | 260—897 |

FOREIGN PATENTS

| | | |
|---|---|---|
| 602,122 | 7/1960 | Canada. |
| 602,151 | 7/1960 | Canada. |

MURRAY TILLMAN, *Primary Examiner.*

DANIEL ARNOLD, LEON J. BERCOVITZ,
*Examiners.*

R. N. COE, J. A. KOLASCH, E. B. WOODRUFF,
*Assistant Examiners.*